United States Patent [19]

Light

[11] Patent Number: 4,776,763
[45] Date of Patent: Oct. 11, 1988

[54] MECHANICAL DAMPING OF TURBINE WHEEL BLADES

[75] Inventor: Stacey H. Light, San Diego, Calif.

[73] Assignee: Sundstrand Corporation, Rockford, Ill.

[21] Appl. No.: 127,701

[22] Filed: Dec. 2, 1987

[51] Int. Cl.⁴ .............................................. F01D 5/10
[52] U.S. Cl. ................................... 416/145; 416/500; 416/144
[58] Field of Search ..................... 416/145, 500, 144

[56] References Cited

U.S. PATENT DOCUMENTS

| 331,369 | 12/1885 | Bliss | 416/145 |
|---|---|---|---|
| 2,140,017 | 12/1938 | Kocht | 416/144 |
| 2,340,133 | 1/1944 | Martin | 416/500 |
| 2,405,283 | 8/1946 | Birmann | 416/500 X |
| 2,435,604 | 2/1948 | Rorden | 416/500 X |
| 2,462,962 | 3/1949 | Harker | 416/500 X |
| 2,664,240 | 12/1953 | Gorton | 416/500 X |
| 2,772,854 | 12/1956 | Anxionnaz | 416/500 X |
| 3,291,446 | 12/1966 | Huebner | 416/500 X |
| 3,687,244 | 8/1972 | Hillegass | 416/144 X |
| 3,728,044 | 4/1973 | Fujita et al. | 416/500 X |
| 3,754,838 | 8/1973 | Fu et al. | 416/145 |
| 3,847,506 | 11/1974 | Straniti | 416/500 X |
| 4,484,859 | 11/1984 | Pask et al. | 416/145 X |

FOREIGN PATENT DOCUMENTS

| 1024218 | 3/1953 | France | 416/500 |
|---|---|---|---|
| 1947725 | 4/1971 | Fed. Rep. of Germany | 416/500 |
| 112006 | 9/1979 | Japan | 416/144 |
| 221906 | 9/1924 | United Kingdom | 416/144 |

*Primary Examiner*—Everette A. Powell, Jr.
*Attorney, Agent, or Firm*—Wood, Dalton, Phillips, Mason & Rowe

[57] ABSTRACT

The selection of the mass of a mechanical damper 20 for a blade 12 in a turbine wheel 10, 12 independent of the size of a damper receiving opening 22 is achieved by making the damper 20, 40, 50, 60, partially hollow (FIG. 4) or completely hollow (FIGS. 5–7, inclusive).

6 Claims, 1 Drawing Sheet

U.S. Patent  Oct. 11, 1988  4,776,763
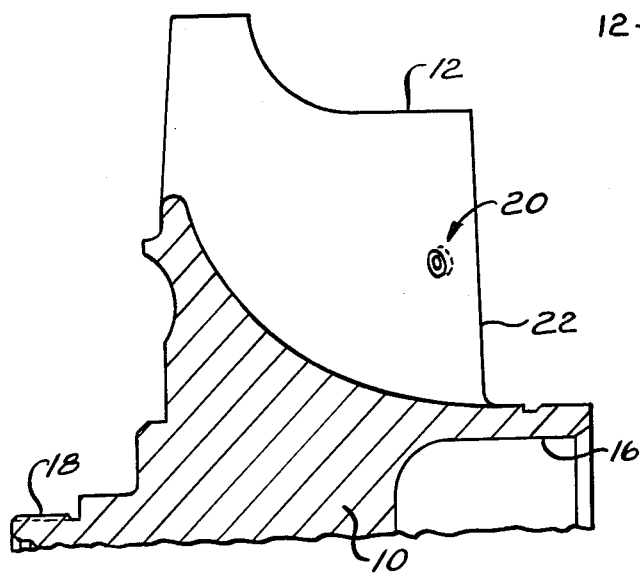
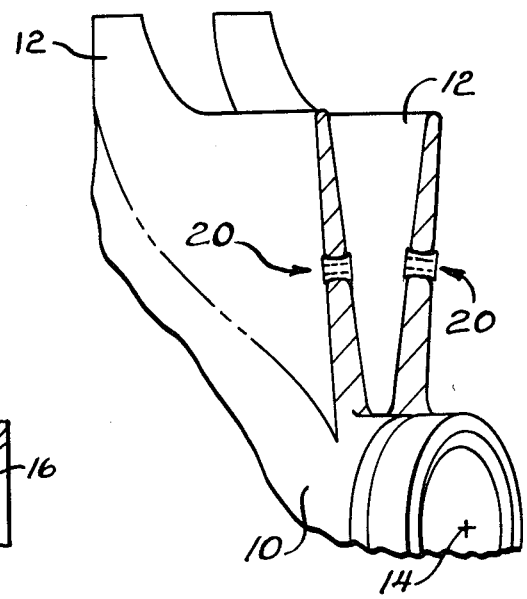
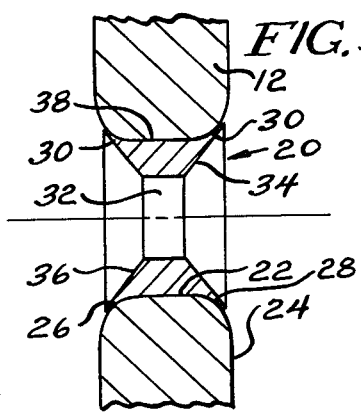
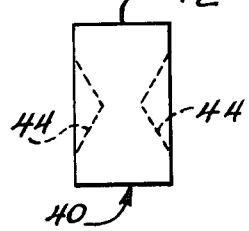
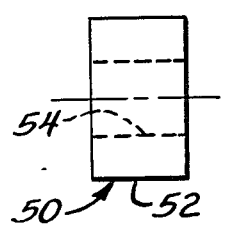
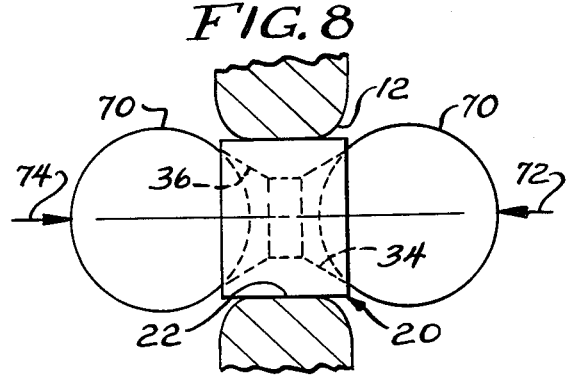
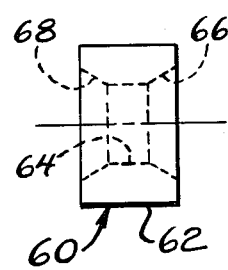
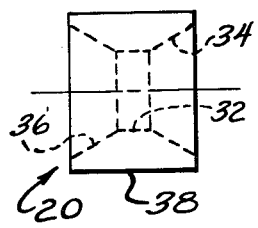

MECHANICAL DAMPING OF TURBINE WHEEL BLADES

FIELD OF THE INVENTION

This invention relates to turbine wheels such as are used in gas turbine engines, and more specifically, to the provision of mechanical damping of the vibration that exists in such blades during use.

BACKGROUND OF THE INVENTION

The blades of one piece turbine wheels in gas turbine engines are subjected to many excitation frequencies during turbine operation. These excitation frequencies are developed by the various components of the turbine engine as well as its accessories.

In attempting to damp the vibration in the turbine blades resulting from such excitation, several problems must be attended to. For one, many natural frequencies with various vibration mode shapes exist for the blades. The blades also operate in a high temperature environment over a broad range of high temperatures as, for example, 700° F.–1800° F.

Not infrequently, the material of which the turbine wheel is formed has low natural damping characteristics. Further, in one piece turbine wheel constructions, assembly of a damping device is difficult because of the geometrical configuration of the one piece construction.

Typically, the blades of the turbine wheel are very thin and high stresses will exist during operation. This will pose restrictions on the additional mass that may be allowed in or added to the blade for damping purposes.

Care must be taken so as not to restrict the flow of the hot gasses and good reliability and wear characteristics are required.

To overcome the foregoing difficulties, there have been a variety of proposals for mechanical dampers that may be applied to turbine wheels. See, for example, U.S Pat. Nos. 2,772,854 issued Dec. 4, 1956 to Anxionnaz; 3,291,446 issued Dec. 13, 1966 to Huebner; and 3,754,838 issued Aug. 28, 1973 to Fu. In addition, reference should be made to French Pat. No. 1,024,218 granted Jan. 7, 1953 to Societe Rateau on an invention by Anxionnaz, such French patent being published on Mar. 30, 1953.

The Anxionnaz and Fu patent publications illustrate damping of turbine blades while the Huebner patent illustrates provision of damping structure within part of the turbine wheel hub itself. In the case of Anxionnaz and Fu, various structures may be used including rivet-like elements that extend through the blade and which are double headed for retention purposes. The Anxionnaz French patent specifically shows such a device intended to achieve friction damping while Fu shows a somewhat similar device but modified so as to achieve impact damping.

In any event, while these structures do achieve their intended purpose, they are not altogether satisfactory because they do not provide a means whereby the mass of the damper can be selected and/or controlled generally independently of the size of the hole within the blade in which the mechanical damper is received.

More particularly, those skilled in the art will readily recognize that stress concentration around a hole formed in a turbine blade increases as a multiple of hole size. At the same time, the hole formed to receive the mechanical damper must be of sufficient size as to allow easy installation while the damper itself must be of a size so as to be retained within such hole. In some cases, this can result in the mass of the damper being larger than desired and that in turn could lead to unduly high stress level at the hole during operation of the turbine wheel in a gas turbine engine.

The present invention is directed to overcoming one or more of the above problems.

SUMMARY OF THE INVENTION

It is the principal object of the invention to provide a new and improved mechanical damped turbine wheel. More specifically, it is an object of the invention to provide mechanical dampers for the blades of a turbine wheel which allow the mass of the damper to be selected generally independently of its dimensions.

An exemplary embodiment of the invention achieves the foregoing object in a structure including a hub adapted to be journaled for rotation at high speed about an axis. A plurality of blades are on the hub at angularly spaced locations and extend outwardly therefrom. Holes are disposed in at least some of the blades and at locations outwardly of the hub and rivet-like dampers are retained in each hole, each damper being at least partially hollow to allow its mass to be selected generally independently of its cross sectional dimension.

According to one facet of the invention, each damper has a recess in at least one end thereof. According to another facet of the invention, each damper has recesses in both ends thereof.

According to still another and preferred facet of the invention, each damper is hollow along its entire length.

In a preferred embodiment, there is at least one hole for each blade on the turbine wheel.

In a highly preferred embodiment, each damper is formed as a double headed rivet with the heads being on opposite sides of the associated blade to secure the rivet within the associated hole.

Other objects and advantages will become apparent from the following specification taken in connection with the accompanying drawings.

DESCRIPTION OF THE DRAWINGS

FIG. 1 is a fragmentary sectional view of a turbine wheel made according to the invention;

FIG. 2 is a fragmentary perspective view of the turbine wheel with parts shown in section for clarity;

FIG. 3 is an enlarged, fragmentary sectional view illustrating a preferred form of the damper of the subject invention as applied to the turbine wheel blade;

FIG. 4 illustrates one form of a mechanical damper made according to the invention prior to its application to a turbine wheel;

FIG. 5 is a view similar to FIG. 4 but of a modified embodiment of a damper;

FIG. 6 is a view similar to FIGS. 4 and 5 but of still a further modified embodiment of the damper;

FIG. 7 is a view similar to FIGS. 4–6 inclusive but of the damper of FIG. 3; and FIG. 8 is an enlarged fragmentary sectional view illustrating the application of the damper of FIG. 7 to a turbine wheel blade.

DESCRIPTION OF THE PREFERRED EMBODIMENTS

An exemplary embodiment of a turbine wheel with mechanical damping means made according to the invention is illustrated in the drawings and with reference to FIGS. 1 and 2 is seen to include a hub 10 from which a plurality of blades 12 outwardly extend. As is typical with one piece turbine wheels, the hub 10 and blades 12 are integral with each other. The hub 10 is intended for rotation at high speed about an axis extending centrally through the hub and shown at the "X" 14 in FIG. 2.

If desired, the hub 10 may have a recess 16 on one end for stress relief, weight reduction and thermal inertia advantages. The other end may be threaded as at 18 for connection to other components of the gas turbine with which the turbine wheel is intended to be used.

It will be appreciated by those skilled in the art from viewing FIGS. 1 and 2 that a so-called radial flow turbine wheel is shown. However, while the mechanical damping means of the invention is preferably applied to a radial flow turbine wheel, the same may also find utility in axial flow turbines.

A mechanical damping means, generally designated 20, is applied to each of the blades 12. As seen in FIGS. 1 and 2, each damping means 20 is just slightly upstream of the throat end 22 of each of the blades 12 and at approximately the mid point radially of the corresponding blade 12 so as to be generally outwardly of the hub 10.

Generally speaking, such a location will correspond to that where a relatively high amplitude of vibration will be found in each blade 12 through a plurality of vibratory modes. Consequently, such a location will provide adequate damping notwithstanding the fact that there are many natural frequencies of vibration within a typical turbine wheel blade 12.

As seen in FIG. 3, the damper 20 is fitted within a hole 22 or bore within each turbine blade 12. The axis of each hole 22 is normal to the surfaces 24 of the blade and its edges, at the point of emergence to the surfaces 24 of the blade are rounded with a relatively generous stress concentration reducing radii 26, 28 which also allow the ends of the damper 20 to be flush with the surfaces 24. One value may be in the range from 0.010-0.020 inches. In a usual case, the diameter of the hole 22 itself may be on the order of about 0.1555 inches and both sides of the blade 12 for an approximately ½ inch radius around the hole 22 will be shot peened to induce compressive stresses.

The damper 20 is then fitted within the hole 22 and opposite sides are peened as at 30 about the radii 26, 28 so as to loosely trap the damper 20 in place while allowing sufficient movement of the damper 20 in the hole 22 to provide friction damping. Thus, once installed, each damper 20 is like a loose, double headed rivet.

Such a construction results in a mechanical damper that will provide mainly friction damping, and since the same can move relative to the blade 12 with the peened ends 30 of the damper 20 alternately impacting against the radii 26, 28, a measure of impact damping as well.

A primary feature of the invention is the fact that each of the dampers 20 is at least partially hollow. As illustrated in FIGS. 3 and 7, the damper 20 includes a central cylindrical bore intersecting frustoconical recesses 34 and 36 opening to opposite ends. By varying the diameter of the bore 32 as well as the dimensions of the recesses 34 and 36 without changing the outer diameter 38 (and thus the diameter of the hole 22), the mass of the damper may be selected generally independently of the diameter of the hole 22.

FIG. 4 illustrates a modified form of a damper 40 having a cylindrical outer surface 42 and frustoconical recesses 44 in opposite sides thereof. The damper 40 illustrated in FIG. 4 has not been deformed as by peening for installation.

Still another form of damper is shown generally at 50 and has a cylindrical outer surface 52 as well as an interior cylindrical bore 54.

FIG. 6 illustrates still another form 60 of a damper having a cylindrical outer surface 62 as well as a cylindrical interior bore 64 intersected by frustoconical recesses 66 and 68 on opposite sides thereof. The damper 60 differs from the damper 20 in that is has a shorter axial length.

Generally, the embodiment illustrated in FIGS. 3 and 7 is preferred in that it allows for easier installation since its ends are more easily peened. However, where greater mass may be required, the frustoconical recesses 34 and 36 may be omitted in favor of a simple cylindrical bore such as the bore 54 illustrated in FIG. 5. Alternatively, where even greater mass is required, the through bore may be omitted in favor of frustoconical recesses such as shown in 44 in FIG. 4. In this regard, where flow of gas within the engine from the pressure side to the suction side of each blade 12 is tolerable or even advantageous, the embodiments of FIGS. 5, 6 or 7 will be employed. Conversely, if such flow is undesirable in a particular installation, the embodiment illustrated in FIG. 4 may be used and yet the advantage of obtaining a desired mass for the damper generally independent of the cross sectional dimension thereof is retained.

FIG. 8 illustrates a preferred method of installing a damper made according to the invention. A pair of hardened steel balls 70 are located on opposite sides of the damper 20 and the same will tend to self center within the frustoconical recesses as the recesses 34, 36 or if the embodiment of FIG. 5 is to be used, the ends of the bore 54.

A squeezing force indicated by arrows 72 and 74 is then applied to the balls 70 sufficiently to deform the selected damper to the configuration illustrated in FIG. 3 without securely locking the damper 20 against movement in the hole 22.

If desired, more than one damper can be installed per blade.

From the foregoing, it will be appreciated that inertia of the damper will allow the blade to move relative to the damper. This relative motion results in a frictional damping force on the blade, which in particular, is applied thereto generally at the radially outer extremity of the hole 22 which is proportional to the product of the centrifugal force applied to the damper during operation and the coefficient of friction between the damper material and the turbine blade material. It is to be particularly noted that such frictional damping will be effective at any frequency of vibration so long as relative motion occurs. By means of the present invention, the mass of the dampers can be sized to adjust the centrifugal force generally independently of the size of the holes 22 in which the dampers are received allowing the latter dimension to be selected according to needs posed by stress concentrations during operation, ease of installation, etc.

Furthermore, some impact damping will occur at various frequencies as the peened ends 30 of the dampers 20 impact against the radii 26 and 28 in alternating fashion as relative movement between the damper 20 and the blades 12 occurs.

The invention allows the dampers to be installed basically flush with the sides 24 of the blades 12 so as not to disturb the flow of gas and flow from the pressure side to the suction side of a blade 12 can be accepted or rejected depending upon the selection of the particular form of damper.

I claim:

1. A damped turbine wheel comprising:
   a hub adapted to be journaled for rotation at high speed about an axis;
   a plurality of blades on said hub at angularly spaced locations and extending outwardly therefrom; and
   a plurality of holes, one for each blade; each located in an associated blade in spaced relation to said hub; and
   a plurality of dampers, one in each hole, each damper being formed as a double headed rivet with the heads being on opposite sides of the associated blade to retain the rivet within the associated hole, each rivet being at least partially hollow to allow the mass of the rivet to be selected generally independently of its cross sectional dimension.

2. The damped turbine wheel of claim 1 wherein each said rivet has a recess in at least one of its heads.

3. The damped turbine wheel of claim 1 wherein each said rivet has recesses in both of its heads.

4. The damped turbine wheel of claim 1 wherein each said rivet is hollow along its entire length.

5. A damped turbine wheel comprising:
   a hub adapted to be journaled for rotation at high speed about an axis;
   a plurality of blades on said hub at angularly spaced locations and extending outwardly therefrom;
   holes in at least some of said blades at locations outwardly of said hub; and
   a plurality of dampers, one in each hole, each damper being formed as a double headed rivet with the heads being on opposite sides of the associated blade to retain the rivet within the associated hole, each rivet being at least partially hollow to allow the mass of the rivet to be selected generally independently of its cross sectional dimension.

6. A damped turbine wheel comprising:
   a hub adapted to be journaled for rotation at high speed about an axis;
   a plurality of blades on said hub at angularly spaced locations and extending outwardly therefrom; and
   holes in at least some of said blades at locations outwardly of said hub; and
   rivet-like dampers retained in each said hole, each damper being at least partially hollow to allow its mass to be selected generally independently of its cross sectional dimension

* * * * *